THOMAS O. SUMMERS, JR.
INVENTOR.

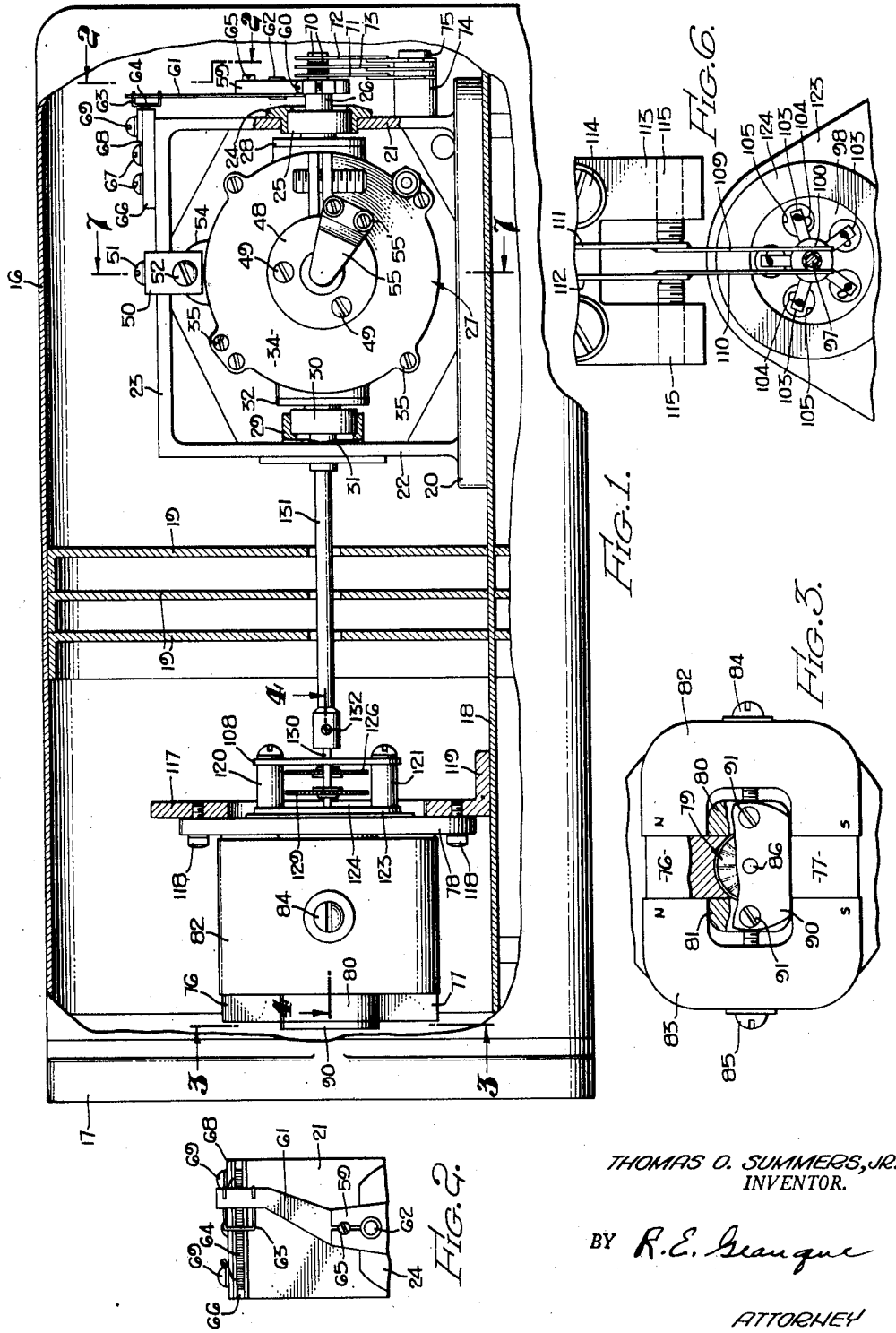

BY R. E. Geangue
ATTORNEY

Sept. 6, 1960  T. O. SUMMERS, JR  2,951,373
RATE INTEGRATOR
Filed Feb. 24, 1954  5 Sheets-Sheet 3
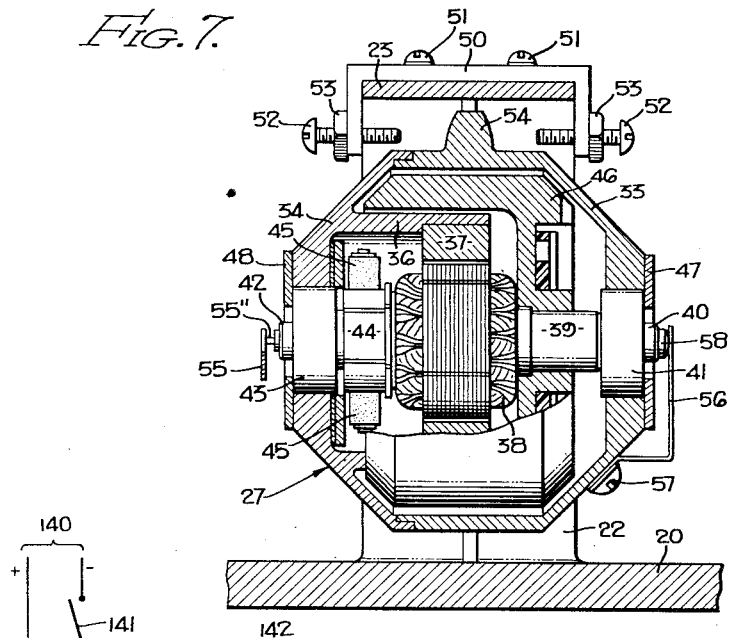
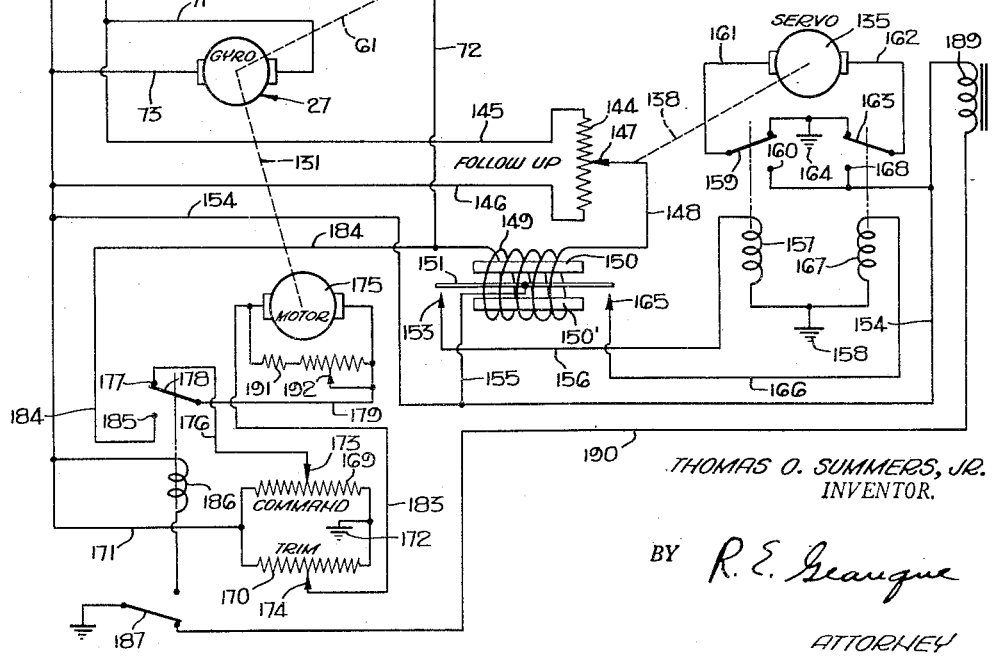
THOMAS O. SUMMERS, JR.
INVENTOR.
BY R. E. Geauque
ATTORNEY

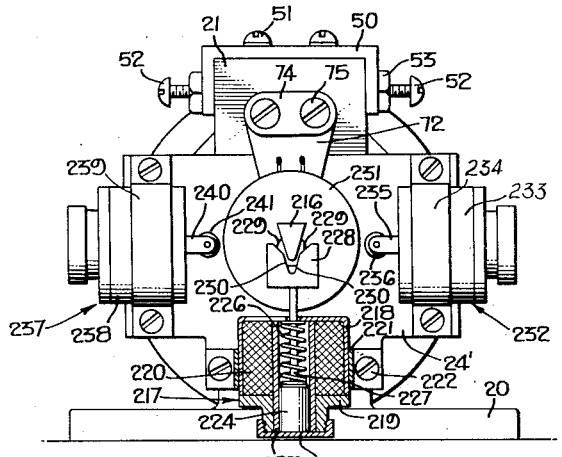
Fig. 13.
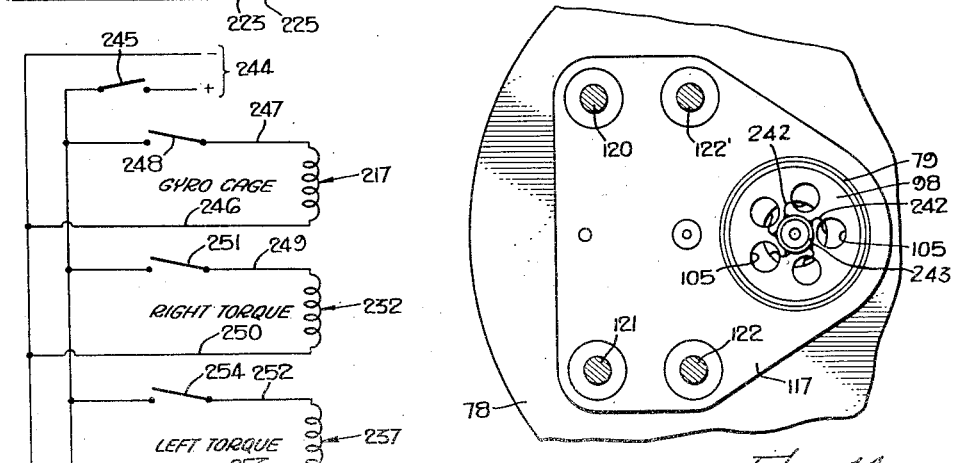
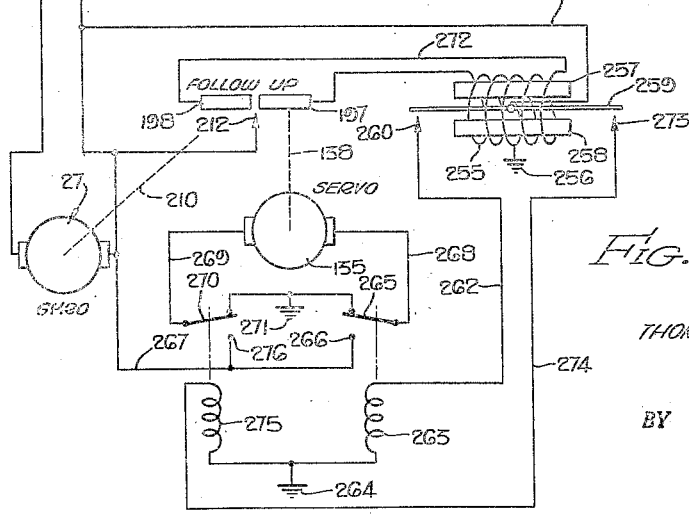
Fig. 14.
Fig. 15.
THOMAS O. SUMMERS, JR.
INVENTOR.
BY R. E. Geauque
ATTORNEY

United States Patent Office 2,951,373
Patented Sept. 6, 1960

2,951,373

RATE INTEGRATOR

Thomas O. Summers, Jr., Encino, Calif., assignor to Summers Gyroscope Company, Santa Monica, Calif., a corporation of California Filed Feb. 24, 1954, Ser. No. 412,313

20 Claims. (Cl. 74—5.5)

This invention relates to gyroscopes and more particularly to a single-gimbal, rate integrating gyroscope in which the gimbal is opposed by a torque or force proportional to precessional velocity so that the displacement of the gyroscope will be an indication of displacement of its mounting craft about any selected axis. By providing a damping force of electrical origin, the rate integrating gyro can be made very simply and complicated temperature control mechanisms can be eliminated.

Previous rate integrating gyros have depended upon the viscosity of a liquid, such as oil, in order to obtain the necessary damping force and costly and complicated temperature control mechanisms have been necessary to reduce the effects of viscosity changes due to temperature variations. In one previous form, the gimbal of the gyroscope is hermetically sealed in an annular inner container which is enveloped in oil and the container and oil are supported by an annular outer container, also hermetically sealed. Such construction is obviously complicated and costly and impairs the performance of the gyro because of the high moment of inertia about the gimbal axis caused by the incorporation of the annular inner container. Since the resistance provided by the oil is a function of its viscosity (which in turn is a function of the temperature of the oil), it is necessary to maintain the oil at a very nearly constant temperature and this has been difficult because of the large area of the inner container which the oil must envelop.

In the present invention, the damping or precession-opposing force is provided by a low inertia damping motor, the armature of which is directly connected to the gyro gimbal, preferably through a gear train, so that the armature turns at a higher angular velocity than the gimbal. Thus, when a field for the armature exists, the resistance to the rotation of the armature will be proportional to its velocity of rotation and this resistance is transmitted directly to the gyro gimbal as a resistance force acting against precession of the gyro. Since the motor is of the low inertia type, it will offer very little inertia resistance to movement of the gyro gimbal. In one form of the invention, the damping motor will not have a commutator and the windings of the motor will be short circuited and connected together in parallel so that the only resistance to precession of the gyroscope, in addition to the electrical damping, will be the gear train and the very low inertia of the motor. Separate means can be provided to both cage and torque the gyro gimbal by exerting the necessary force directly on the gimbal axis. By utilizing electrical damping, there is no necessity for providing a correction for temperature changes as is necessary in prior devices where the use of a viscous fluid, such as oil, is utilized.

In another form of the invention, it is proposed to employ the damping motor to cage the gyro gimbal to its null or other selected reference position and also to accomplish course changes, drift corrections, etc., by providing the armature of the motor with brushes for independently energizing the armature. Since the armature is directly connected to the gimbal, the gimbal can be moved angularly at various rates through the simple expedient of applying appropriate voltages to the brushes of the damping motor. The brushes might, of course, be one of the major sources of friction and therefore error in such a rate integrator except for the fact that the gear train minimizes the effect of brush friction. The brush friction which the gimbal must overcome is directly proportional to the gear train, but the damping resistance, on the other hand, increases with the square of the gear train ratio since both the damping force and its mechanical advantage over the gimbal increase simultaneously with the ratio of the gear train. While brush friction is a source of error, its effect is minimized through the incorporation of a gear train coupler affording high armature-to-gimbal mechanical advantage.

By the present invention the usual type of rate gyro is converted into a rate integrating gyro by removing the gimbal restraining springs and opposing the precession of the gimbal by a damping force of electrical origin which provides a resistance force to precession which is proportional to precessional velocity. Thus, the rate integrator of this invention has the advantage over the usual type of rate gyro in that its output is the time integral of rate or in other words, is displacement. The rate integrator can be supplied with any well known type of pickoff so that the movement of the gyro will give a signal of craft displacement and this signal can be utilized by a servo for control purposes.

It is therefore an object of the present invention to provide a rate integrator comprised of a single gimbal gyro precessing against a resistance force proportional to precessional velocity, said resistance force being developed by a device directly connected to the gimbal of the gyro.

Another subject of the present invention is to provide a single gimbal gyro whose precession is resisted by a force proportional to precessional velocity through the expedient of directly connecting the gimbal to an electrical damping device.

A still further object of the present invention is to provide a rate integrator comprised of a single gimbal gyro which is directly connected to the armature of a low inertia motor, so that the precession of the gyro is opposed by the movement of the armature within a stationary magnetic field.

Another object of the invention is the provision of a rate integrator to measure displacement by means of a single gimbal gyro directly connected by a gear train to the armature of a low inertia type motor, said gear train affording high armature-to-gimbal mechanical advantage.

Another object of the invention is to provide a rate integrator having a single gimbal connected to the armature of a low inertia motor through a gear train and having means for both caging and torquing the gyro gimbal by supplying a voltage to the armature of the low inertia motor through a commutator.

A further object of the invention is to provide means independent of the low inertia damping motor for both caging and torquing the gyro gimbal at any selected time.

A still further object of the invention is to provide a guidance system in which a displacement signal is obtained from a rate integrator, which signal is utilized to control a servo motor to correct for any such displacement.

These and other objects of the invention not specifically enumerated above will become readily apparent from the accompanying description and drawings in which:

Figure 1 is a side elevational view of the rate integrator showing the single gimbal gyro connected to the damping motor through a gear train.

Figure 2 is a view along line 2—2 of Figure 1 showing the pickoff for the rate integrator.

Figure 3 is an elevational view along line 3—3 of Figure 1 showing the construction of the damping motor.

Figure 6 is a view along line 6—6 of Figure 4 showing the commutator for the damping motor.

Figure 7 is a vertical sectional view along line 7—7 of Figure 1 showing the construction of the gyro motor and rotor.

Figure 8 is a schematic wiring diagram of the control system utilizing the rate integrator and showing the manner in which the gyro is caged and torqued by current supplied to the damping motor.

Figure 13 is an elevational view along line 13—13 of Figure 9 showing the caging and torquing solenoids positioned to act against the gimbal shaft.

Figure 14 shows the manner in which the individual coils of the damping motor are connected together to form a damping means for this modification.

Figure 15 is a schematic wiring diagram of the control circuit for the modified form of invention having the on-off pickoff and physical follow-up system.

Figure 4:
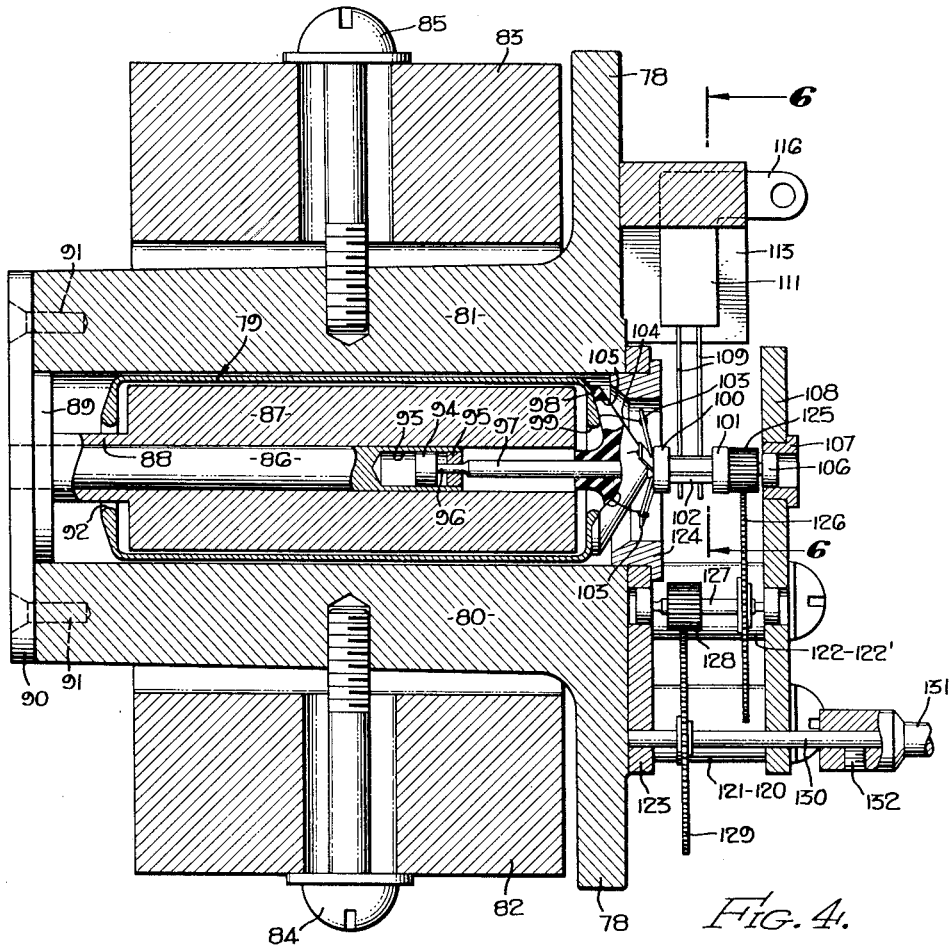
Figure 4 is a horizontal sectional view along line 4—4 of Figure 1 illustrating the construction of the armature of the damping motor.

Referring to the form of the invention illustrated in Figure 1, the rate integrator has a casing 16 secured to a base 17 and the casing 16 contains a support member 18 and partition members 19. The member 18 supports the base 20 of the gyro and legs 21 and 22 extend upwardly from the base and are connected together by a cross member 23. The leg 21 has a circular opening for receiving bearing retainer 24, which supports the ball bearing 25 for shaft 26 of the gyro gimbal 27. The shaft 26 is rigidly secured to a plate 28 which is in turn secured to the gimbal by means of screws. In a similar manner, leg 22 has a circular opening for receiving bearing retainer 29 which supports bearing 30 for gimbal shaft 31. The shaft 31 is supported by a circular member 32 rigidly secured to the gimbal 27 by means of screws. The gyro gimbal 27 is composed of casing sections 33 and 34 (see Figure 7) which are secured together by screws 35 and an extension 36 of the section 34 retains a permanent magnet 37 in position to coact with the windings 38 mounted on shaft 39 of the gyro. The end 40 of shaft 39 is supported in bearings 41 retained in an opening in section 33 and the end 42 of shaft 39 is supported by bearings 43 retained in an opening in section 34. The shaft 39 carries a commutator 44 in position to cooperate with stationary brushes 45. The gyro rotor 46 is rigidly secured to shaft 39 for rotation therewith about the axis of shaft 39, which axis is perpendicular to the axis of shafts 31 and 26 about which the gyro is free to precess. The bearings 41 and 43 have retainer rings 47 and 48 respectively which are secured to the sections of the gimbal by means of screws 49.

The cross member 23 supports a U-shaped bracket 50 which is secured thereto by means of screws 51 and each leg of the bracket carries an adjustable screw 52 which can be secured in any selected position by means of a lock nut 53. A projection 54 on the gyro gimbal is positioned between the ends of the screws 52 and the screws serve to define the limits of precession movement permitted to the gyro gimbal. A conducting plate 55 is secured to section 34 of the gimbal by screws 55' and has one end bearing against a conducting pin 55" retained in the end 42 of shaft 39. A second conducting plate 56 is secured to gimbal section 33 by means of screws 57 and continually bears against the conducting pin 58 in end 41 of shaft 39. These conducting plates 55 and 56 serve, respectively, as the current supply and ground connection for the motor of the gyroscope.

A split bracket 59 has an opening for receiving gimbal shaft 26 and has screws 60 for tightening the bracket section onto the shaft. One end of a wiper arm 61 is secured by rivet 62 to the bracket 59 and the other end of the wiper arm is offset and carries a wiper 63, which continually bears against the potentiometer winding 64. The pressure of wiper 63 against winding 64 is adjusted by a screw 65 carried by bracket 59 and having its end bearing against wiper arm 61. The winding 64 is carried by a member 66 secured to the cross member 23 by screws 67 and an insulated member 68 is secured to member 66 and has contact posts 69 for the electrical leads to the winding. Thus, upon precession of the gyro relative to its mounting structure, the wiper 63 will move over the winding 64 to provide a signal corresponding to the amount of displacement of the gyro gimbal.

The end of shaft 26 carries three slip rings 70 and the wipers 71, 72 and 73 each bear against one of these slip rings. These wipers are carried by an insulated bracket 74 secured to leg 21 by means of screws 75 and the wiper 72 serves to connect with the wiper arm 61 while the wipers 71 and 73 serve to connect respectively with conducting plates 55 and 56 in order to complete the circuit for the gyro motor. Thus the motor and the wiper 63 are continually supplied with an electrical circuit, regardless of the position they may assume relative to the frame of the gyro.

The damping motor of the present invention comprises two pole pieces 76 and 77 which are cast integral with a flange 78 and have curved ends positioned for receiving the motor armature 79. The pole pieces are connected together at their curved ends by curved members 80 and 81 which are of a non-magnetic material and serve only to hold the pole pieces in proper relation to the armature. Two permanent magnets 82 and 83 are secured to members 80 and 81 respectively by screws 84 and 85 and each end of each magnet makes contact with one of the pole pieces in order to develop a flux path through the pole pieces. The armature 79 is positioned in the circular opening defined by the members 80 and 81 and the curved ends of pole pieces 76 and 77 and is mounted on a shaft 86 which projects into the central opening of the armature core 87. The core 87 is integral with an extension 88 which connects with positioning section 89 and end plate 90 secured to members 80 and 81 by screws 91. The armature 79 has an end opening 92 for receiving the shaft 86 and the extension 88. An end opening in shaft 86 retains a stop 94 and bearings 95 for supporting the reduced end 96 of the motor shaft 97. A cap member 98 of insulating material is securely mounted on shaft 97 and is secured to the windings of the armature 79 around the circumference of end opening 99 in the armature. The shaft 97 also mounts insulated discs 100 and 101 which support a series of commutator bars 102 having extensions 103 connecting with the individual coils of the armature through leads 104 (see Fig. 6) passing through openings 105 in member 98. The other end of shaft 97 is supported by bearing 106 in retainer member 107 mounted by a support member 108. Two pair of brushes 109 and 110 continually bear against the commutator bars 102 in order to supply electrical current to the armature 79 of the motor and the pair of brushes 109 is carried by a member 111 while the pair of brushes 110 is carried to a member 112. These members are supported by a U-shaped bracket 113 secured to flange 78 by screws 114 and each flange contains a screw 115 bearing against members 111 and 112 in order to adjust the pressure of the respective brushes against the commutator bars. Each of the members 111 and 112 have an extension 116 for connecting with the electrical leads for the motor.

The windings of armature 79 are impregnated with a plastic material so that they are self-supporting and since the armature contains no iron, undesirable magentic influences are eliminated. Further, the bearings for shaft 97 are of the low friction type and offer very little frictional resistance to rotation of the shaft. Because of the construction of the motor, it will be seen that the resistance torque opposing rotation of the gimbal is proportional to angular velocity of the gimbal without adding unduly to the gimbal inertia. Since the armature is light, it can be supported at one end by cap member 98 while the other end has the opening 92 through which the supporting extension 88 for the core can pass. The magnetic field for the motor passes from the permanent magnets to the pole pieces 76 and 77 and through the iron core 87. While a direct current motor having five coils has been illustrated, it is understood that other motor constructions can be also utilized.

The complete motor structure is supported by a bracket 117 which is secured to the flange 78 by screws 118 and which has a leg 119 secured to support member 18. Four spacing members 120, 121, 122 and 122' (see Fig. 14) are secured to flange 78 and support the mounting members 123 and 108 in spaced relation with the member 123 held against flange 78 and containing a positioning member 124 extending into the opening for the armature. The support members 108 and 123 carry the gear train which connects the armature of the motor to the gimbal 27 of the gyro. A gear 125 is rigidly secured to shaft 97 and meshes with a larger gear 126 on shaft 127 supported at its ends in bearings contained in members 108 and 123 respectively. Shaft 127 likewise carries a gear 128 which meshes with a larger gear 129 carried by shaft 130, likewise supported by members 108 and 123. The end of shaft 130 is rigidly secured in a socket in the end of shaft 131 by means of a screw 132 and this shaft 131 is integrally formed with shaft 31 of the gyro gimbal.

Since the gyro gimbal is rigidly connected through shaft 31 and through the gear train to the armature 79 of the low inertia damping motor, the precessional movement of the gyro gimbal will rotate the armature of the motor within its magnetic field. It is apparent that the armature of the motor, rotating within the magnetic field, will produce a resistance force against the gimbal which is proportional to the precessional velocity of the gimbal and because of the high gear ratio between the shaft 31 and the armature, the armature will rotate much faster than the gimbal in order to produce this damping force. While the brushes are a source of friction which could result in error in that this friction would likewise oppose the movement of the gyro gimbal, such error is greatly minimized by the effect of the gear train since the brush friction which the gimbal must overcome is directly proportional to the gear train ratio but the damping resistance, on the other hand, increases with the square of the gear train ratio because both the damping force and its mechanical advantage over the gimbal increases simultaneously with the ratio of the gear train. Thus, the gear train, composed of gears 125, 126, 128 and 129, comprises a gear coupler affording a high armature-to-gimbal mechanical advantage in order to minimize the effect of brush friction, and since the damping force of the motor is proportional to the velocity with which the armature moves, the gimbal will receive a damping force proportional to its precessional velocity and the error of brush friction will be greatly minimized. Because this damping force is proportional to gimbal velocity, and because gimbal torque is proportional to aircraft angular rate, it is apparent that gimbal angular velocity is proportional to aircraft angular velocity. Gimbal angular velocity and aircraft angular velocity being proportional, it is further apparent that the displacement of the gyro gimbal 27 and of the wiper 63, secured to the shaft of the gyro, will represent displacement of the craft about the input axis of the gyro.

Figure 5:
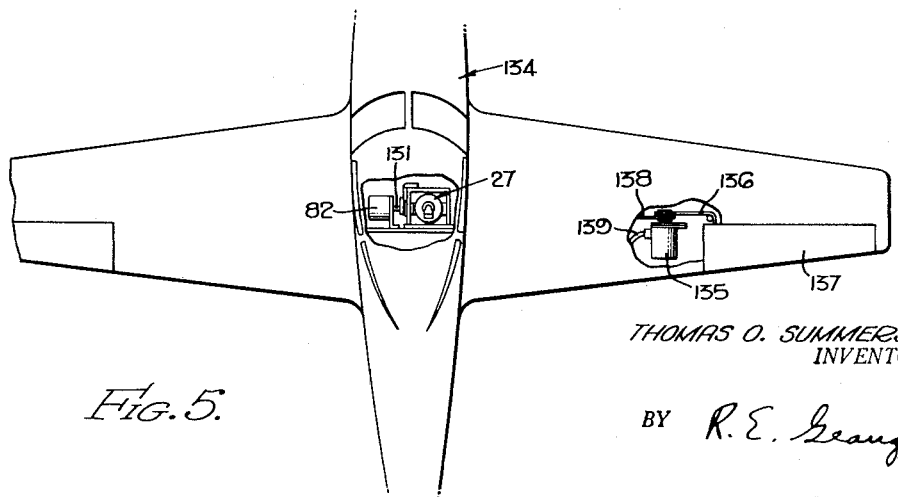
Figure 5 is a plan view of an aircraft mounting the rate integrator and showing the servo for controlling an aileron of the aircraft.
Figure 9:
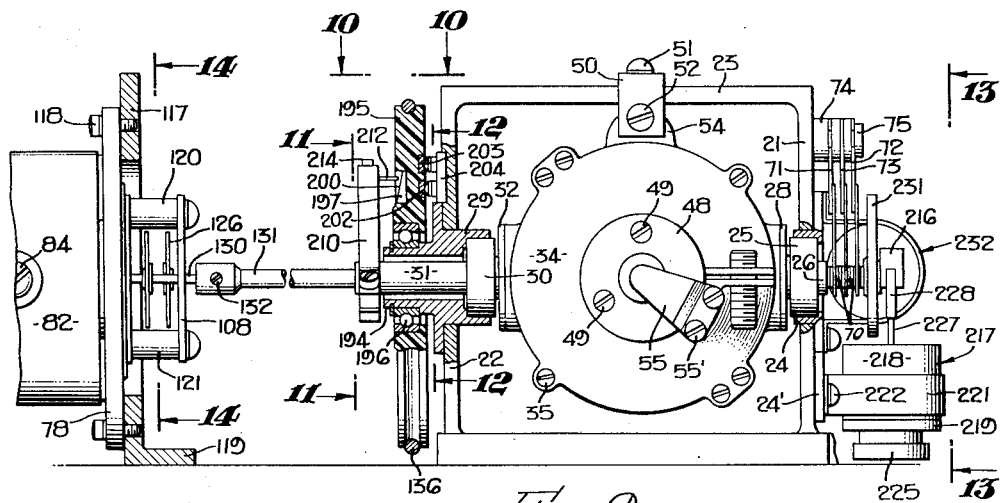
Figure 9 is an elevation view, partly in section, of a modification of the invention wherein the rate integrator has a physical follow-up.
Figure 11:
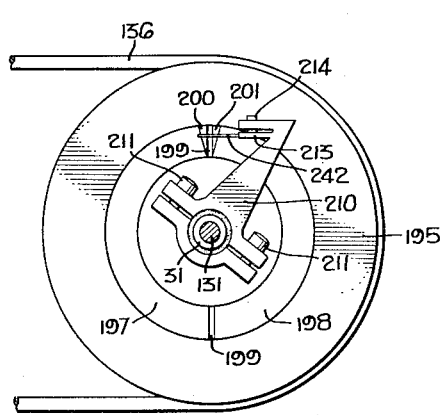
Figure 11 is a view along line 11—11 of Figure 9 illustrating the manner in which the follow-up adjusts the pickoff.
Figure 10:
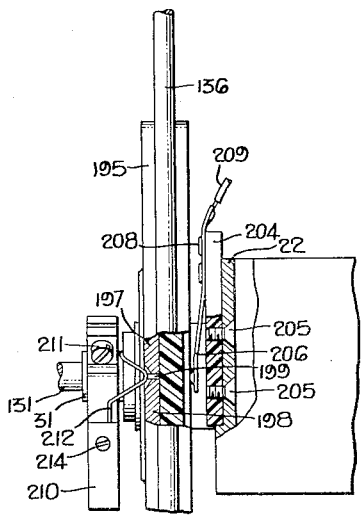
Figure 10 is a plan view along line 10—10 of Figure 9 illustrating the pickoff for the modified form of the invention.
Figure 12:
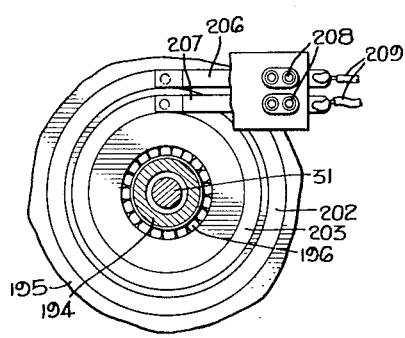
Figure 12 is a view along line 12—12 of Figure 9 illustrating the electrical connection for the on-off pickoff.

The rate integrator of this invention can be utilized as a part of a guidance system in order to control the attitude of the aircraft about any selected axis. Referring to Figure 5, the rate integrator is shown mounted in an aircraft 134 with the spin axis of the gyro in the normally vertical plane and the gimbal axis transverse of the aircraft in the horizontal plane so that the gyro will sense displacements of the craft about its roll aixs. A servo motor 135 is positioned in the wing of the aircraft and has a link 136 for moving aileron 137 and also has a follow-up link 138 for control purposes. The current supply is led to the servo motor through cable 139 and it is understood that the servo unit will control both ailerons of the aircraft. The schematic wiring diagram of a suitable guidance system is illustrated in Figure 8 and has a power source 140 controlled by a master switch 141. This power source energizes the gyro motor through connections 71 and 73 and likewise energizes winding 64 through leads 142 and 143. A follow-up winding 144 is likewise connected across the power source 140 by lines 145 and 146 and this winding has a follow-up wiper 147 connected by link 138 to the servo 135. The wiper 63 and the follow-up wiper 147 are connected together through connector 72 and line 148 which contains a winding 149 passing around two spaced magnets 150 and 150'. A switch arm 151 is pivotally mounted between the magnets 150 and 150' so that when no current flows through winding 149, the poles of the two magnets will maintain the switch arm in a center position.

In operation, when the craft moves about its roll axis in a direction to move wiper 63 upwardly on winding 64 as seen in Figure 8, then the potential of wiper 147 will become positive with respect to wiper 63 and current will flow from wiper 147 to wiper 63 through winding 149 and cause the switch arm 151 to move against contact 153. This will cause current to flow through lines 154, 155 and 156 to solenoid 157 and then to ground 158. Energization of solenoid 157 will move switch arm 159 against contact 160 and will complete the circuit from line 154 through line 161 and to servo motor 135, which is connected through line 162 and switch 163 to ground 164. Thus, the servo 135 will be energized to rotate the ailerons in a direction to oppose the displacement of the mounting craft about its roll axis, and follow-up link 138 will move wiper 147 upwardly in order to eliminate any potential difference between wipers 147 and 63 and stop the flow of current in coil 149 through the usual follow-up action. As the movement of the aileron by the servo causes the aircraft to come back to its original position, the wipers 63 and 147 will be moved back to their central position where no current will flow through the coil 149 and any displacement of the aircraft will be eliminated.

In the event that aircraft moves about the roll axis in the opposite direction and the wiper 63 moves downwardly as seen in Figure 8, then the potential of wiper 63 will become positive with respect to wiper 147 and current will flow from wiper 63 to wiper 147 through winding 149 and will cause the switch arm 151 to move against contact 165. This will cause current to flow through lines 154, 155, 166 to solenoid 167 and then to ground 158. The energization of the solenoid 167 will move switch arm 163 against contact 168 so that current will flow through lines 154 and 162 to servo motor 135 and then to ground 164 through lead 161 and switch arm 159. Thus, the servo 135 will be driven in the reverse direction from that previously described and cause the wiper 147 to move downwardly on winding 144 to provide the usual follow-up action. The movement of the servo will cause the aileron to correct for the displacement of the aircraft about the roll axis and will cause wipers 63 and 147 to return to their null positions after the displacement is eliminated.

In the guidance system, means are provided for caging the gyroscope to its null position or any other preselected position and for torquing the gyro in order to turn the craft in any desired manner. Since the damping motor is provided with brushes 109 and 110 it is possible to selectively apply as current to the armature of the motor in order to accomplish this caging and torquing. In order to torque the gyro and turn the craft, two resistances 169 and 170 are connected in parallel between lead 171 and ground 172 and these resistances have wipers 173 and 174 respectively. The wiper 173 is connected to one side of damping motor 175 through lead 176, contact 177, switch arm 178 and lead 179 and the wiper 174 is connected to the other side of motor 175 through lead 180, switch arm 181, contact 182 and line 183. The winding 170 and wiper 174 comprises a trim potentiometer and can be positioned to change the null position of wiper 63 in a manner presently to be described. By moving the command wiper 173 on winding 169 in one direction or the other away from its position opposite wiper 174, current will flow through the motor to produce a torque in one direction or the other on the gyro gimbal which will change the position of wiper 63 and cause the aircraft to move about the roll axis in the desired direction. It is apparent that the amount of torque produced will depend upon the amount of movement of wiper 173 in either direction. Once the wiper 173 is returned to its original position, the wiper 63 will again control the aircraft.

In order to cage the gyro to its null or other selected position, the wiper 63 is connected by line 184 to contact 185 and a solenoid 186 is selectively connected through a switch 187 to ground so that the solenoid can be energized to move arm 178 against contact 185. The solenoid operated clutch 189 of the servo motor is connected between line 154 and line 190 and is also grounded through switch 187. During torquing of the gyro gimbal, the clutch is continually energized so that the servo drives the control surface to make the aircraft turn. However, when it is desired to cage the gyro, the switch 187 is moved to energize solenoid 186 and deenergize clutch 189. When solenoid 186 is energized, the arm 178 removes wiper 173 from the control circuit and connects the wiper 63 to one side of the motor 175 while the wiper 174 is connected to the other side of the motor. Thus, current will flow through the motor in a direction to move wiper 63 until its position on winding 64 corresponds to the position of trim wiper 174 on winding 170, at which time current flow through the motor will cease. It is apparent that the position of trim wiper 174 will determine the caged position of wiper 63 and after the gyro has been caged, the switch arm 187 can be moved to deenergize solenoid 186 and place the aircraft again under the control of wiper 63 at which time the servo clutch will again be energized to drive the control surface.

A complete guidance system has been described utilizing the rate integrator. The damping motor 175 has a shunt 191 connected across the motor and the wiper 192 can be moved to adjust the load on the motor and thus the damping force applied to the gyro gimbal. While the rate integrator has been described as controlling the aircraft about the roll axis, it is apparent that it can be utilized to control the aircraft about any other axis, such as pitch or yaw. This guidance system is comprised of a minimum of parts since the damping motor serves both the function of placing a damping force on the gimbal and also the function of caging and torquing the gimbal.

Another form of the invention is illustrated in Figures 9 through 15 wherein the gyroscope is equipped with an on-off type of pickoff which has a physical follow-up from the control servo and in this modification, like reference numerals designate like parts as in the previous embodiment. In this modification the bearing retainer 29 has an extension 194 which serves to mount a circular, insulated member 195 by means of ball bearings 196. The member 195 carries two spaced segments 197 and 198 separated by a space 199 and the surfaces of these members opposite space 199 are cut away to form surfaces 200 and 201 which are further apart at the top of the space than they are at the bottom of the space. The opposite side of member 195 carries two separate conducting rings 202 and 203 and the ring 202 is connected to segment 197 and the ring 203 is connected to segment 198. The upright leg 22 of the gyro frame carries an insulated plate 204 by means of screws 205 and the plate 204 mounts two wipers 206 and 207 which bear respectively against conducting rings 202 and 203. The wipers are mounted by means of rivets 208 and each wiper is connected with a lead 209 to supply a circuit to its corresponding conducting ring and pickoff segment.

The shaft 31 is extended to receive a divided wiper arm 210 which has its components positioned on opposite sides of shaft 31 and secured together by screws 211 in order to rigidly hold the wiper on the shaft in any desired position. A wiper 212 of V-shape is secured at one end to a leg 213 of the wiper arm and a screw 214 bears against the leg to which the wiper is connected in order to move the wiper up and down relative to the surfaces 200 and 201 to thereby adjust the sensitivity of the wiper, since the lower the wiper is placed the quicker it will come into contact with either surface 200 or 201. The member 195 has a groove around its circumference to receive the follow-up cord 136 which is connected to the servo 135 in the previously described manner. The end of shaft 26 mounts a series of three slip rings 70 in the same manner as in the previous embodiment and these slip rings have contact arms 71, 72 and 73 bearing thereagainst in the same manner as in the previous embodiment. The wiper arms are likewise mounted by an insulated bracket 74 secured to upright leg 21 by screws 75 and the slip rings serve the same functions of supplying a circuit to the gyro motor and a circuit to the wiper 212 around the gyro gimbal.

In this modification, the various coils of the damping motor are connected together in parallel so that there is substantially a full load on the armature of the damping motor when acting as a generator. The brushes and commutator are eliminated and the rate integrator is equipped with caging and torquing devices which are independent of the damping motor. The shaft 26 carries at its end a V-shaped wedge member 216 which will move with the gyro gimbal during precession of the gyro. The bearing retainer 24 has a large flange 24' which mounts an electromagnet 217 which is comprised of circular casing 218 and end member 219 for enclosing the winding 220. The casing 218 is secured to flange 24' by means of a circular bracket 221 held by screws 222. The winding 220 surrounds a central, cylindrical member 223 containing an iron armature 224 which is continually biased against the end plate 225 by means of spring 226 positioned between the armature and the casing 218. A shaft 227 is connected at one end to the armature 224 and carries at the other end a member 228 which contains a notch formed by a pair of surfaces 229 and a pair of surfaces 230 with the surfaces being at an angle to each other. When it is desired to cage the gyro, the electro-magnet 217 is energized to move the armature 224 into the winding 220 and in turn, move the member 228 against the wedge 216 which, of course, can be in any tilted position prior to caging. The surfaces 229 will first engage the wedge 216 in order to move it into alignment so that the wedge can be received by the groove formed by surfaces 230 and thereafter, the wedge will be locked in a position corresponding to the null position of the gyro. The gimbal shaft 26 also carries a circular cam member 231 having its center above the center of shaft 26 and movement of this member will torque the gyro into any selected position. An electromagnet 232 identical in construction to the electromagnet 217 is positioned at one side of cam 231 and has an outer circular casing 233 and a circular bracket 234 for retaining the casing on the flange 24'. The armature of electromagnet 232 connects with a member 235 which carries a roller 236 at its end and when the electromagnet is energized, the roller 236 will be forced against the surface of member 231 at a point above the center line of shaft 26. Therefore, the roller 236 will serve to place a torque about the gimbal axis and can move the member 231 and the gimbal about its axis. The roller 236 will permit the member 231 to move relatively to the arm 235 and the arm 235 can move longitudinally as the cam member moves away from electromagnet 232.

A second electromagnet 237 likewise constructed in a same manner as electromagnet 217, is positioned on the opposite side of cam member 231 and has a circular casing member 238 and a circular retaining bracket 239. An arm 240 is connected at one end to the armature of the electromagnet and carries at its other end a roller 241 which engages the cam member 231 upon energization of the electromagnet in order to torque the gyro gimbal in the opposite direction from that of arm 235. When the electromagnet 237 is energized, the roller 241 will engage the cam plate 231 at a point above the axis of shaft 26 and the force of the electromagnet will produce a torque about shaft 26 which can move member 231 and the gimbal of the gyro to any selected position. The electromagnets 217, 232 and 237 therefore provide means to both cage the gyro to its null position and also to torque the gyro in either direction in order to obtain a turn signal for maneuvering the mounting craft. Since the caging and torquing is done independently of the damping motor, the independent coils of the motor can be connected together in parallel in the manner shown in Figure 14 so that the motor windings will give maximum damping. Each of the coils has a lead 242 which connects to a common ring 243 mounted on the motor shaft and therefore it is unnecessary for the motor to have a commutator and accompanying brushes. The rate integrator of this modification includes the gyro just described and the damping motor which are connected together by the rigid shaft 131 and gearing in the same manner as the previous embodiment so that the damping motor will develop a drag force which is proportional to the precessional velocity of the gyro. The movements of the wiper 212 will represent displacement of the mounting craft about any preselected axis as in the previous embodiment.

The rate integrator of this second modification can be incorporated in the guidance system for the mounting craft illustrated in Figure 15, wherein the guidance system is equipped with a power source 244 having a master switch 245. The caging electromagnet 217 is connected across the power source by leads 246 and 247 and through a switch 248 which can be closed to energize the electromagnet 217 and cage the gyro at any desired time. In a similar manner, the electromagnet 232 is connected across the power source through leads 249 and 250 and through switch 251 and the electromagnet 237 is likewise connected across the power source through leads 252 and 253 and switch 254. Thus, if it is desired to turn the aircraft in one direction, the electromagnet 232 will be energized by switch 251 and if it is desired to turn the aircraft in the other direction, the switch 254 will be closed. It is understood that the gyro of this modification will be positioned in the mounting craft in the manner illustrated in Figure 5, wherein the spin axis of the gyro is in the normally vertical plane and the gyro controls the servo motor 135 in order to position the mounting craft about its roll axis. With the gyro so positioned, if the aircraft is displaced about its roll axis so that wiper 212 moves against contact segment 197, current will flow from wiper 212 through contact 197 to the left side of winding 255 and then to ground 256. The winding surrounds two magnets 257 and 258 which normally hold pivoted switch arm 259 in its central position when no current is flowing through either side of the center tapped solenoid winding 255. However, when current flows through the left half of the winding, the switch arm 259 will tip against contact 260 which will cause current to flow from lead 261 through the switch arm 259 and through lead 262 and solenoid winding 263 to ground 264. Energization of solenoid 263 will move switch arm 265 against contact 266 and will cause current to flow through leads 267 and 268 to servo motor 135 and then through lead 269 and switch arm 270 to ground 271. This will cause the servo motor to move the ailerons in a direction to correct for any displacement of the craft and at the same time the follow-up link 138 will move the member 195 until wiper 212 is again positioned between contact segments 197 and 198. The movement of the aileron starts to correct for the displacement of the aircraft and when the aircraft is again back to its original position, wiper 212 will be aligned with space 199 through the usual follow-up action.

In the event that the craft is displaced in the opposite direction, so that wiper 212 moves against segment 198, current will flow through lead 272 to the right half of the winding 255 and then to ground. This will cause switch arm 259 to pivot against contact 273 and current will flow through lead 274 and solenoid 275 to ground 264. Energization of solenoid 275 will move switch arm 270 against contact 276 and current will flow from lead 267 through lead 269 to servo motor 135 and then through lead 268 and switch arm 265 to ground 271. This will cause the servo motor to move in the opposite direction from that previously described and move the ailerons in a direction to correct for displacement about the roll axis and the follow-up 138 will operate in the same manner to move the member 195 in a direction to keep the space 199 under the wiper. Thus, it is seen that the rate integrator can be utilized in a guidance system without the necessity of external energization of the armature 79 and that the damping motor will provide a damping force which will result in movement of the gyro proportional to displacement of the mounting craft.

The rate integrator of the present invention provides a simple method of controlling the displacement of its mounting craft and it is understood that a rate integrator can be positioned to be responsive to displacement about any one or more selected axes. Further, the present invention can replace the conventional two gimbal gyroscope which is considerably more complicated in construction and expensive to produce since the rate integrator gives the same displacement signal as such a two gimbal gyro. Since it is not necessary to place the gimbal in a large volume of oil in order to obtain a damping force proportional to precessional velocity, temperature compensating means are unnecessary and the large moments placed on the gimbal by oil containers are eliminated. Two types of servo systems have been illustrated in connection with the invention, but it is understood that various other types of servos can be utilized. Various other modifications are contemplated by those skilled in the art without departing from the spirit and scope of the invention as hereinafter defined by the appended claims.

What is claimed is:

1. A rate integrator comprising a gyro rotor mounted in a single gimbal for movement about the axis of said gimbal, and means for integrating the precessional velocity of said gimbal comprising a low inertia damping means having a stationary magnetic field and an armature winding rotatable within said field, and rigid means for connecting said armature to said gimbal in order to transfer the rotational movement of said gimbal to said armature and thereby produce a reaction force on said gimbal proportional to the velocity of movement of said gimbal, said gimbal being restrained only by said damping means.

2. A rate integrator as defined in claim 1 wherein said armature is composed of separate individual coils connected together in parallel to provide maximum load on said windings and maximum reaction force, said coils being impregnated with a plastic supporting material so as to have no eddy current losses.

3. A rate integrator as defined in claim 2 having means for caging said gyro gimbal to any pre-selected null position, said caging means being operative upon a member carried by the gimbal shaft.

4. A rate integrator as defined in claim 2 having means for torquing said gyro gimbal in one direction or the other, said torquing means comprises a member carried by said gimbal shaft and solenoid means for selectively engaging one side or the other of said member at a position displaced from the axis of said gimbal.

5. A rate integrating gyro comprising a gyro rotor mounted in a single gimbal for precessional movement around the axis of said gimbal, electrical damping means for providing a reaction force proportional to the velocity of movement imparted thereto, said damping means comprising a fixed stationary magnetic field and an armature rotatable within said field, and having an electrical load connected to the armature, means for rigidly connecting said armature to said gimbal so that the movement of said gimbal is imparted to said armature to produce a resistance force proportional to the velocity of movement of said gimbal and commutator means for energizing said armature to selectively produce a torque upon said gyro gimbal, said gimbal being restrained only by said damping means.

6. A rate itnegrator as defined in claim 5 wherein said armature is connected to said gimbal through a gear train providing high armature-to-gimbal mechanical advantage so as to minimize the effect of commutator friction upon the movement of the gimbal when the armature is not energized by the commutator means.

7. A rate integrator comprising a gyro rotor mounted on a single gimbal for precessional movement about the axis of said gimbal, a low inertia means comprising a stationary magnetic field and an armature rotatable within said field and having an electrical load connected thereto, said armature being comprised of windings which are impregnated with a plastic material in order to make the armature windings self-supporting and to eliminate eddy current losses, and means for connecting said armature to said gimbal for rotational movement therewith so that said armature will produce a reaction force upon said gimbal proportional to precessional velocity of the gimbal, said gimbal being restrained only by said low inertia means.

8. A rate integrator as defined in claim 7 wherein said connecting means contains a gear train coupler having a high armature-to-gimbal mechanical advantage, said armature being provided with commutator bars and brushes in order to selectively energize said armature and torque said gyro in one direction or the other, said gear train coupler providing means to minimize the effect of brush friction upon the movement of said gimbal.

9. A control system for a movable craft comprising a gyro rotor positioned within said craft and mounted by a single gimbal, said gyro rotor and gimbal being positioned within said craft to precess upon displacement of said craft about a pre-selected axis thereof, a low inertia means comprising a fixed field and a rotatable armature, means for connecting said armature to said gimbal for rotational movement thereby, an on-off pickoff positioned about said gimbal axis, a servo motor controlled by said pickoff in order to move the control surface of said craft in accordance with the displacement of said craft about said pre-selected axis and physical follow-up means connected to said on-off pickoff and movable by said servo motor, the rotation of said armature by said gimbal producing a reaction force upon said gimbal proportional to the precessional velocity thereof so that said on-off pickoff is controlled by displacement of said craft about the selected axis.

10. A control system as defined in claim 9 having selectively operable means independent of said low inertia means for caging said gyroscope to a pre-selected position and selectively operable means independent of said low inertia means for torquing said gyro gimbal in one direction or the other in order to selectively turn the craft.

11. A rate integrator comprising a gyro rotor mounted by a single gimbal for precessional movement about the axis of said gimbal, electrical damping means comprising a fixed field and a rotatable armature, means for connecting said armature to said gyro gimbal for rotation thereby upon precession of said gimbal and adjustable shunt means placed across the output of said armature in order to adjust the load on said armature and thereby adjust the damping effectiveness of said damping means, said gimbal being restrained only by said damping means.

12. A rate integrating gyro comprising a gyro rotor mounted upon said craft by a single gimbal, said gyro rotor being mounted for precessional movement upon displacement of said craft about a selected axis thereof, electrical means comprising a stationary field and an armature rotatable within said field, said armature having windings supported by non-magnetic material in order to eliminate magnetic losses in said electrical means, means for connecting said armature to said gimbal for rotational movement therewith so that said armature will produce a reaction force upon said gimbal proportional to precessional velocity of the gimbal and thereby integrate the precessional velocity, and means connected to said gimbal for sensing angular displacement of said craft about said selected axis, said gimbal being restrained only by said electrical means.

13. A control system as defined in claim 12 wherein said armature has minimum inertia and is supported by low friction bearings so that the effect of said armature on gimbal inertia is minimized.

14. A control system as defined in claim 13 having commutator means for selectively energizing said armature to place a torque upon said gimbal and rotate said gimbal.

15. A rate integrating gyro comprising a gyro rotor mounted in a single gimbal for precessional movement around the axis of said gimbal, electrical damping means for providing a reaction force proportional to the velocity of movement imparted thereto, said damping means comprising a pair of members mounted for rotation relative to one another, one of said members being a magnetic field producing member and the other of said members being a circular armature winding located within said magnetic field, and means for connecting said gimbal to one of said members to impart rotational movement of said gimbal to said damping means, said gimbal being restrained solely by said electrical damping means.

16. A rate integrating gyro as defined in claim 15 wherein said armature winding is wholly supported by non-magnetic material to eliminate electrical losses in said damping means.

17. A rate integrating gyro comprising a gyro rotor mounted in a single gimbal for precessional movement around the axis of said gimbal, electrical damping means for providing a reaction force proportional to the velocity of movement imparted thereto, said damping means comprising a stationary magnetic field and a circular armature winding rotatable within said field, means for connecting an electrical load to said armature winding and means for connecting said gimbal to said armature winding to impart rotational movement of said gimbal to said damping means and produce a resistance force on said gimbal proportional to the velocity of movement of said gimbal, said gimbal being restrained solely by said electrical damping means during precession of said gyro.

18. A rate integrating gyro as defined in claim 17 having a commutator means for energizing said armature winding to selectively produce a torque upon said gimbal, said armature winding being wholly supported by nonmagnetic material to eliminate eddy current losses in said damping means.

19. A rate integrating gyro comprising a gyro rotor mounted in a single gimbal for precessional movement about the axis of said gimbal, electrical means having two relatively movable members for producing a reaction force proportional to the velocity of relative movement, one of said members being a magnetic field producing member and the other of said members being an armature means located within said magnetic field, and means for rigidly connecting said gimbal to one of said members to produce a reaction force on said gimbal proportional to the velocity of movement of said gimbal, said gimbal being restrained only by said electrical means and said rigid connecting means comprising a gear train providing high armature-to-gimbal mechanical advantage.

20. A gyroscopic device for controlling a movable craft about one axis thereof comprising a gyro rotor mounted in a single gimbal for movement in response to angular movement of said craft about said axis, said gimbal exerting a torque proportional to the velocity of angular movement, a reaction torque producer comprising two relatively movable means for producing a reaction torque proportional to the velocity of relative movement, rigid means for connecting said gimbal to one of said relatively movable means to produce said relative movement, one of said relatively movable means comprising a field producing means and the other of said relatively movable means comprising means located within the field of said field producing means for producing said reaction torque and selectively energizable for coaction with said field to selectively develop a torque upon said gimbal.

References Cited in the file of this patent
UNITED STATES PATENTS

| | | |
|---|---|---|
| 1,831,597 | Henderson | Nov. 10, 1931 |
| 1,900,709 | Henderson | Mar. 7, 1933 |
| 2,417,689 | Johnson | Mar. 18, 1947 |
| 2,590,428 | Noxon | Mar. 25, 1952 |
| 2,595,268 | Kellogg | May 6, 1952 |
| 2,646,947 | Kutzler et al. | July 28, 1953 |
| 2,712,757 | Schaberg | July 12, 1955 |

FOREIGN PATENTS

| | | |
|---|---|---|
| 546,013 | France | Aug. 7, 1922 |
| 124,508 | Australia | June 5, 1947 |